(12) United States Patent
Kobayashi et al.

(10) Patent No.: US 12,061,430 B2
(45) Date of Patent: Aug. 13, 2024

(54) FIXING BELT AND HEAT FIXING DEVICE

(71) Applicant: CANON KABUSHIKI KAISHA, Tokyo (JP)

(72) Inventors: Noriaki Kobayashi, Ibaraki (JP); Hiroki Muramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/341,065

(22) Filed: Jun. 26, 2023

(65) Prior Publication Data

US 2024/0004330 A1 Jan. 4, 2024

(30) Foreign Application Priority Data

Jun. 29, 2022 (JP) ................................. 2022-104586
Jun. 16, 2023 (JP) ................................. 2023-099353

(51) Int. Cl.
*G03G 15/20* (2006.01)
*B32B 25/00* (2006.01)
*B32B 25/02* (2006.01)

(52) U.S. Cl.
CPC ......... *G03G 15/2057* (2013.01); *B32B 25/02* (2013.01); *G03G 15/2053* (2013.01); *B32B 2264/20* (2020.08); *B32B 2264/50* (2020.08); *G03G 2215/2016* (2013.01)

(58) Field of Classification Search
CPC ........... G03G 15/2053; G03G 15/2057; G03G 15/206; G03G 2215/2016; G03G 2215/2035; Y01T 428/254; Y01T 428/269; B32B 25/02; B32B 27/20; B32B 2264/10; B32B 2264/102; B32B 2264/20; B32B 2264/50

USPC ................................... 399/329, 333; 219/216
See application file for complete search history.

(56) References Cited

U.S. PATENT DOCUMENTS

| 7,195,853 B1 * | 3/2007 | Pickering | ........... G03G 15/2057 430/124.35 |
|---|---|---|---|
| 8,965,262 B2 | 2/2015 | Muramatsu | |
| 9,063,491 B2 | 6/2015 | Matsunaka et al. | |
| 9,086,664 B2 | 7/2015 | Matsunaka et al. | |

(Continued)

FOREIGN PATENT DOCUMENTS

| JP | 2007-219371 A | 8/2007 |
|---|---|---|
| JP | 2015-036752 A | 2/2015 |

(Continued)

OTHER PUBLICATIONS

Masafumi Arakawa, "Particle Size Measurement," 43 J. Jpn. Soc. Colour Mater. 333-334 (1970).

*Primary Examiner* — Robert B Beatty
(74) *Attorney, Agent, or Firm* — Venable LLP

(57) ABSTRACT

A fixing belt including a base layer, an elastic layer and a surface layer, wherein the elastic layer has a total thickness of 200 to 3,000 μm, has a thermal conductivity of 0.4 W/(m·K) or more in a total thickness direction thereof, and contains fillers in a content of 40 to 60 vol % with respect to the total volume of the elastic layer. The fillers in a region A of the elastic layer have a practical sphericity SA of 0.75 or more, and a content ratio of the fillers in the region A is 60 vol % or less with respect to the region A. The fillers in a region B have a practical sphericity SB of less than 0.75, and a content ratio of the fillers in the region B is 40 vol % or more with respect to the region B.

16 Claims, 6 Drawing Sheets

(56) References Cited

U.S. PATENT DOCUMENTS

| | | | |
|---|---|---|---|
| 10,545,439 B2 | 1/2020 | Matsumoto et al. | |
| 10,859,955 B2 | 12/2020 | Asaka et al. | |
| 2002/0016400 A1 * | 2/2002 | Kiyomura | C09D 127/16 |
| | | | 524/545 |

FOREIGN PATENT DOCUMENTS

| | | | | |
|---|---|---|---|---|
| JP | 2019-159126 A | 9/2019 | | |
| JP | 2019-215454 A | 12/2019 | | |
| JP | 2019-215532 A | 12/2019 | | |
| WO | WO-2018235919 A1 * | 12/2018 | | B32B 15/09 |

* cited by examiner

FIXING BELT AND HEAT FIXING DEVICE

BACKGROUND

Technical Field

The present disclosure relates to a fixing belt to be used in a heat fixing device of an electrophotographic image forming apparatus, and relates to a heat fixing device.

Description of the Related Art

A fixing member having a configuration, which is obtained by laminating an elastic layer containing a rubber excellent in heat resistance such as a silicone rubber on a base layer including a resin or a metal, is available as a fixing member to be used in the heat fixing device of an electrophotographic image forming apparatus, such as a printer, a copying machine, or a facsimile. In addition, to impart high thermal conductivity in the thickness direction of the elastic layer, a heat conductive filler may be incorporated into the elastic layer (Japanese Patent Application Laid-Open No. 2007-219371).

To cope with a demand for a further improvement in durability of the electrophotographic image forming apparatus, a further improvement in durability of the fixing member has started to be required. In this connection, the above-mentioned fixing member has the following problem: the compressive deformation and release of the elastic layer are repeated to peel the base material and elastic layer of the member from each other. To cope with the problem, in Japanese Patent Application Laid-Open No. 2019-159126, there is a disclosure that a foam layer is arranged between the base layer and elastic layer of a fixing member to improve an adhesive property therebetween through the anchor effect by which the penetration of the elastic layer into the foam layer is facilitated. In addition, in Japanese Patent Application Laid-Open No. 2019-215454, there is a disclosure that the surface of the base material of a fixing member is subjected to etching treatment with a silane compound to covalently bond a hydrogen-bonded silyl group of the base layer thereof and a vinyl group of a silicone rubber for forming an elastic layer to each other, to thereby improve an adhesive force between the base layer and the elastic layer.

According to an investigation made by the inventors, in a fixing member obtained by incorporating a large amount of a filler into its elastic layer, even when such a technology of improving an adhesive force between the base layer and elastic layer of the member as described in each of Japanese Patent Application Laid-Open No. 2019-159126 and Japanese Patent Application Laid-Open No. 2019-215454 is applied, rupture has occurred near the interface of the elastic layer with the base layer, and by extension, part of the elastic layer has peeled from the base layer in some cases.

SUMMARY

At least one aspect of the present disclosure is directed to providing a fixing belt which has high thermal conductivity in its thickness direction, and which can prevent an elastic layer and the base layer from peeling therebetween even when used over a long time period. In addition, at least one aspect of the present disclosure is directed to providing a heat fixing device that can stably form a high-quality electrophotographic image.

According to at least one aspect of the disclosure, there is provided a fixing belt including: a base layer; an elastic layer; and a surface layer, wherein the elastic layer has a total thickness of from 200 μm to 3,000 μm, has a thermal conductivity of from 0.4 W/(m·K) to 2.0 W/(m·K) in a total thickness direction thereof, and contains fillers in a content of from 40 vol % to 60 vol % with respect to the total volume of the elastic layer. The fillers contained in the region A has a practical sphericity SA of 0.75 or more, the practical sphericity SA representing a shape of the fillers contained in the region A, and a content ratio of the filler contained in the region A is 60 vol % or less with respect to the region A, where the region A is a region in a range from an interface between the base layer and the elastic layer to a depth of 50 μm in the thickness direction of the elastic layer. The fillers contained in a region B has a practical sphericity of less than 0.75, the practical sphericity SB representing a shape of the filler contained in the region B, and a content ratio of the fillers contained in the region B is 40 vol % or more with respect to the region B, where the region B is a region corresponding to a depth of 50 μm or more from the interface between the base layer and the elastic layer in the thickness direction of the elastic layer. The practical sphericity SA is calculated from the following equation (3), and the practical sphericity SB is calculated from the following equation (4):

$$SA = (VA/VAe)^{(1/3)} \qquad \text{Equation (3)}$$

where VA represents a volume of the filler in the region A, and VAe represents a volume of a circumsphere of the filler in the region A;

$$SB = (VB/VBe)^{(1/3)} \qquad \text{Equation (4)}$$

where VB represents a volume of the filler in the region B, and VBe represents a volume of a circumsphere of the filler in the region B.

In addition, according to another aspect of the present disclosure, there is provided a heat fixing device including: the above-mentioned fixing belt; and a pressurizing member arranged to face the fixing belt.

Further features of the present disclosure will become apparent from the following description of exemplary embodiments with reference to the attached drawings.

DESCRIPTION OF THE EMBODIMENTS

Figure 1:
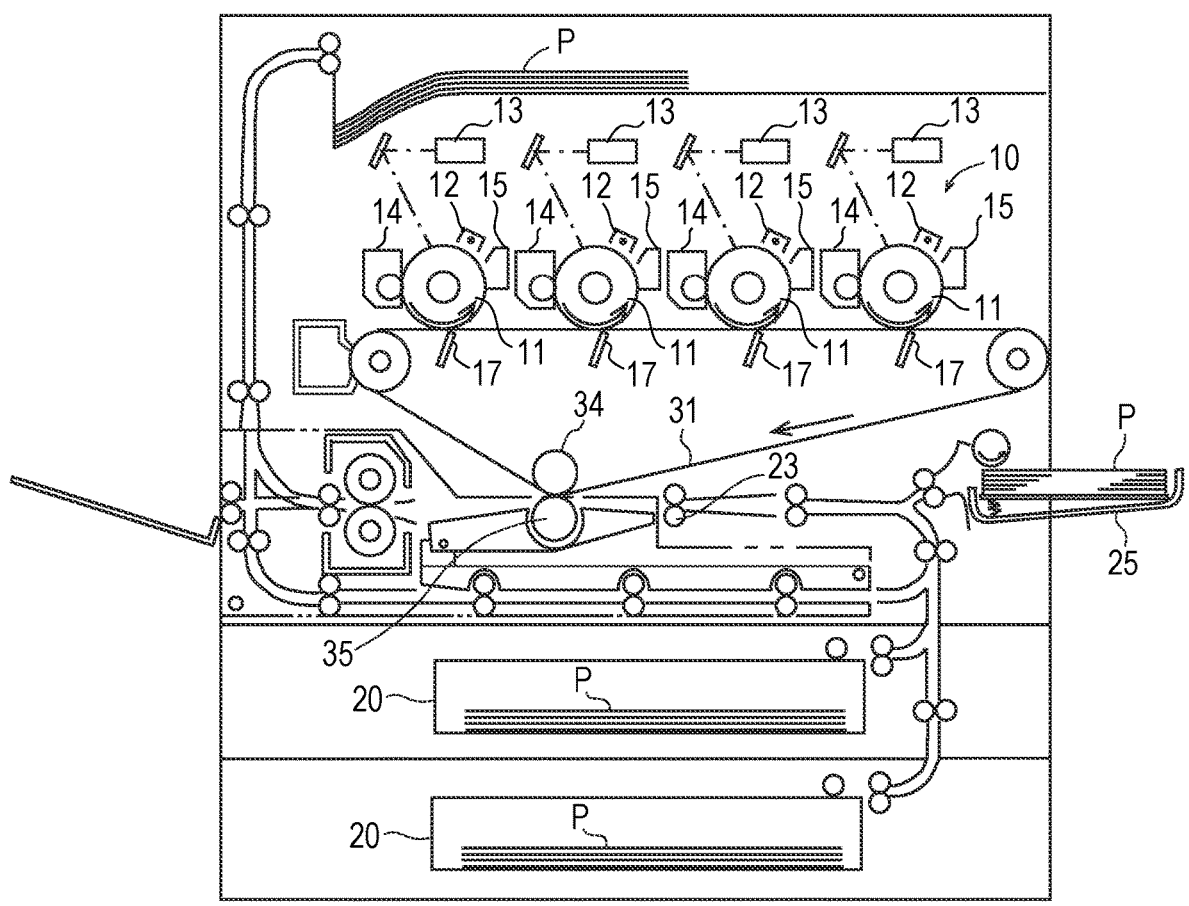
FIG. 1 is a schematic view of an image forming apparatus in a first embodiment.

Herein, the descriptions "XX or more and YY or less" and "from XX to YY" representing numerical ranges each mean a numerical range including a lower limit and an upper limit that are end points unless otherwise stated. In addition, when numerical ranges are described in a stepwise manner, the descriptions disclose that the upper limits and lower limits of the respective numerical ranges are arbitrarily combined.

As mentioned above, in a fixing belt obtained by incorporating a large amount of a filler into its elastic layer, even when such a technology of improving an adhesive force between the base layer and elastic layer of the member as described in each of Japanese Patent Application Laid-Open No. 2019-159126 and Japanese Patent Application Laid-Open No. 2019-215454 is applied, part of the elastic layer peels from the base layer. The inventors have assumed the reason for the peeling to be as described below.

In a fixing step, moving paper is brought into contact with the surface of the surface layer of the fixing belt, and hence the surface layer tries to follow the conveyance of the paper. Accordingly, strain occurs in the elastic layer. Here, the elastic layer and the base layer are strongly bonded to each other, and hence the strain may be liable to be accumulated in the interfacial region of the elastic layer on its base layer side. Further, the inventors have made an investigation, and as a result, have found that the shape of the filler in the elastic layer affects the rupture of the elastic layer near the interface of the elastic layer with the base layer. That is, when the shape of the filler present in the interfacial region of the elastic layer is nonspherical, a stress concentrates on a specific site of the filler at the time of the accumulation of the strain in the interfacial region to cause a crack in the elastic layer. In addition, as the crack grows, the rupture occurs near the interface of the elastic layer with the base layer to cause the peeling. In view of the foregoing, the inventors have made an investigation on the use of a filler, which is closer to a spherical shape, that is, has a practical sphericity to be described later close to 1.00, as the filler. However, an elastic layer obtained as a result of the foregoing has shown a reduction in thermal conductivity in its thickness direction in some cases.

In view of those investigation results, the inventors have obtained the following findings: from the viewpoint of preventing the rupture in the interfacial region of the elastic layer with the base layer, the shape of the filler is preferably a spherical shape or a shape close to a spherical shape; and from the viewpoint of imparting high thermal conductivity in the thickness direction of the elastic layer, the shape of the filler is preferably a shape deviating from a spherical shape. In the present disclosure, the shape deviating from a spherical shape is sometimes referred to as "nonspherical shape." Here, the inventors have obtained the following investigation result: the strain is liable to concentrate particularly in a thickness region from the surface of the elastic layer on a side facing the base layer (interface between the base layer and the elastic layer) to a position at 50 µm toward the opposite surface (interface between the elastic layer and the surface layer). The region is hereinafter also referred to as "region A." In view of the foregoing, the inventors have produced and evaluated a fixing belt including the following elastic layer: a filler having a spherical shape or a shape close to a spherical shape is incorporated into the region A; and a nonspherical filler is incorporated into a region from the position, which is distant from the interface between the elastic layer and the base layer by 50 µm in the thickness direction of the elastic layer, to the interface between the elastic layer and the surface layer (hereinafter also referred to as "region B"). As a result, the inventors have found that the fixing belt hardly causes rupture in the interfacial region of the elastic layer with the base layer and peeling resulting therefrom even when used over a long time period while the thermal conductivity of the elastic layer in its thickness direction shows a value as high as 0.40 W/(m·K) or more.

The fixing belt according to at least one aspect of the present disclosure includes at least: a base layer; an elastic layer; and a surface layer. The elastic layer has a total thickness of from 200 µm to 3,000 µm, and the elastic layer has a thermal conductivity of 0.4 W/(m·K) or more in a total thickness direction thereof. In addition, the elastic layer contains fillers in a content of from 40 vol % to 60 vol % with respect to total volume of the elastic layer. Further, the fillers contained in the region A has a practical sphericity SA of 0.75 or more, the practical sphericity SA representing a shape of the fillers contained in the region A, and a content ratio of the fillers contained in the region A is 60 vol % or less with respect to the volume of the region A. The region A is a region in a range from an interface between the base layer and the elastic layer to a depth of 50 µm in the thickness direction of the elastic layer.

The fillers contained in a region B has a practical sphericity of less than 0.75, the practical sphericity SB representing a shape of the filler contained in the region B, and a content ratio of the fillers contained in the region B is 40 vol % or more with respect to the volume of the region B. The region B is a region corresponding to a depth of 50 µm or more from the interface between the base layer and the elastic layer in the thickness direction of the elastic layer.

In the present disclosure, as a parameter for evaluating the sphericity of the fillers, "practical sphericity" is employed. That is, the practical sphericity of the fillers in the region A is defined as practical sphericity SA, and the practical sphericity of the fillers in the region B is defined as practical sphericity SB. The practical sphericity SA is calculated from the following equation (3), and the practical sphericity SB is calculated from the following equation (4):

$$SA=(VA/VAe)^{(1/3)} \quad \text{Equation (3)}$$

in the equation (3), VA represents the volume of the filler in the region A, and VAe represents the volume of the circumsphere of the filler in the region A; and $$SB=(VB/VBe)^{(1/3)} \quad \text{Equation (4)}$$

in the equation (4), VB represents the volume of the filler in the region B, and VBe represents the volume of the circumsphere of the filler in the region B. Accordingly, as clearly seen from the equations (3) and (4), a filler having the practical sphericity of 1.00, has a shape of perfect sphere.

A fixing belt having an endless belt shape according to at least one embodiment of the present disclosure is described in detail below. The technical scope of the present disclosure is not limited to the following description.

FIG. 1 is a sectional view of a color electrophotographic image forming apparatus according to at least one aspect of the present disclosure in a direction along the direction in which a recording material is conveyed. In the present disclosure, the electrophotographic image forming apparatus is also simply referred to as "printer".

The printer illustrated in FIG. 1 includes an image forming portion 10 for each of yellow (Y), magenta (M), cyan (C), and black (Bk) colors. A photosensitive drum (photosensitive member) 11 is charged by a charger 12 in advance. After that, the photosensitive drum 11 is exposed to light by a laser scanner 13, and hence an electrostatic latent image is formed thereon. The electrostatic latent image is turned into a toner image by a developing unit 14. The toner images on the photosensitive drums 11 are sequentially transferred onto, for example, an intermediate transfer belt 31 serving as an image-bearing member by primary transfer blades 17. After the transfer, toner remaining on the photosensitive drum 11 is removed by a cleaner 15. As a result, the surface of the photosensitive drum 11 is cleaned to prepare for next image formation.

A recording material P is fed from a sheet-feeding cassette 20 or a multi-sheet-feeding tray 25 one by one into a pair of registration rollers 23. The pair of registration rollers 23 receives the recording material P once, and when the recording material skews, the pair of registration rollers straightens the material. Then, the pair of registration rollers feeds the recording material P into a space between the intermediate transfer belt 31 and a secondary transfer roller 35 in synchronization with the toner images on the intermediate transfer belt 31. The color toner images on the intermediate transfer belt are transferred onto the recording material P by, for example, the secondary transfer roller 35 serving as a transfer member. After that, the recording material P is heated and pressurized by a fixing unit 40, and hence the toner images on the recording material P are fixed to the recording material P.

Figure 2:
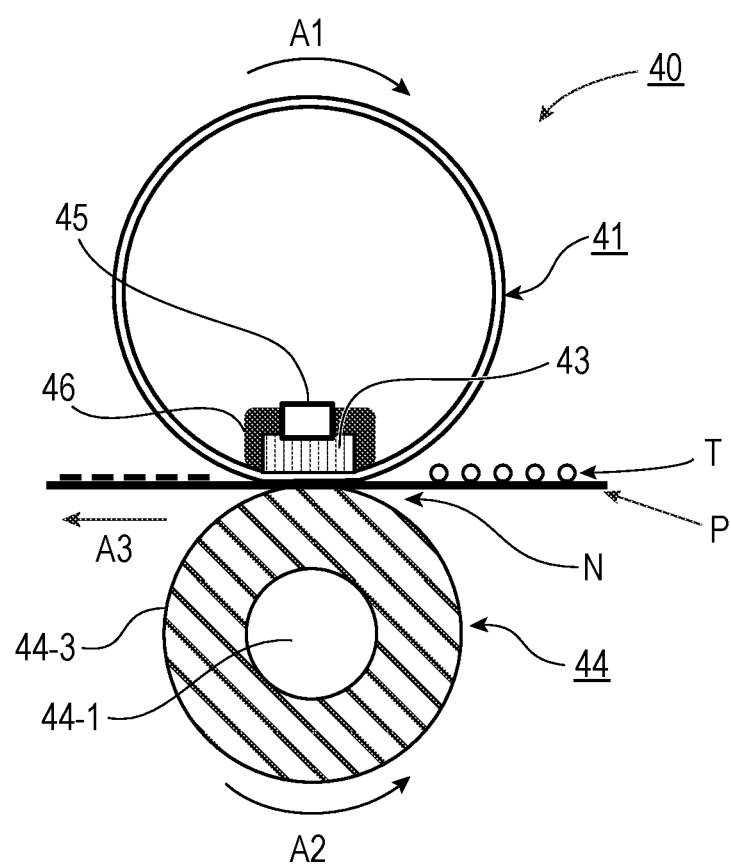
FIG. 2 is a schematic view of a fixing device in the first embodiment.

Next, a fixing device according to at least one aspect of the present disclosure is described. A fixing device 40 whose outline configuration is illustrated in FIG. 2 is a heating device of such a type (tensionless type) as to heat a fixing film having an endless belt shape (hereinafter also referred to as "fixing belt"). However, the fixing device according to the present disclosure is not limited to the heating device of such type, and for example, a heating device of such a type as to heat a roller is also included therein. In Examples to be described later, the heating device of such a type as to heat a fixing film illustrated in FIG. 2 was used.

In a ceramic heater (hereinafter described as "heater") serving as a heating body 43, at least a thin plate-shaped ceramic substrate extending in a direction (longitudinal direction) perpendicular to the drawing sheet and a resistor layer, which is arranged on the surface of the ceramic substrate and generates heat when energized, are integrated with each other. The ceramic heater 43 is held by a heater holder 46. The ceramic heater 43 is a low-heat capacity heater whose temperature is rapidly increased by the energization of the resistor layer. In addition, the ceramic heater 43 may be configured to be capable of switching the region of the resistor layer to be energized in accordance with the size of the recording material in its longitudinal direction.

A fixing belt 41 having an endless shape, the belt serving as a heating member for transferring heat to the unfixed toner images on the recording material P, is loosely fitted onto the supporting member (heater holder 46) including the above-mentioned heater 43.

Figure 3:
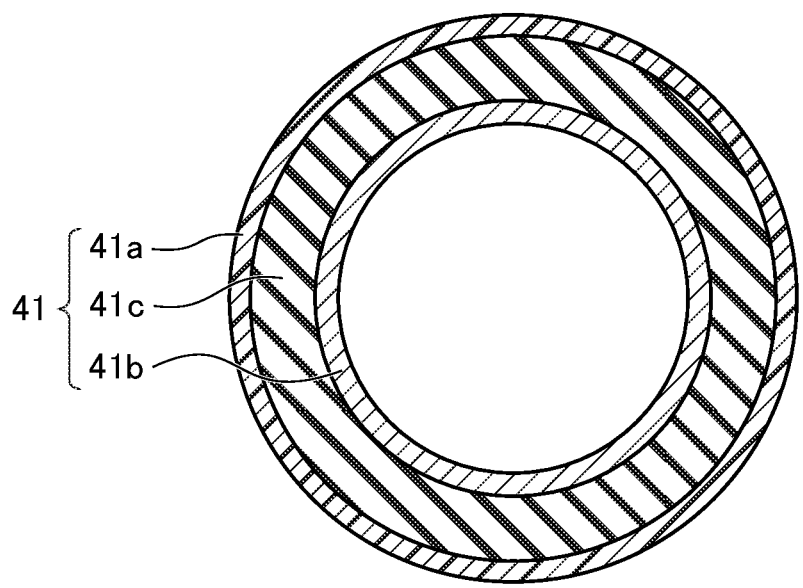
FIG. 3 is a schematic view of a fixing film in the first embodiment.

As illustrated in FIG. 3, the fixing belt 41 according to one aspect of the present disclosure includes at least a surface layer 41a, an elastic layer 41c, and a base layer 41b in the stated order. The fixing belt according to the present disclosure may include a layer except the surface layer 41a, the elastic layer 41c, and the base layer 41b. For example, the belt may include an adhesion layer (not shown) between the surface layer 41a and the elastic layer 41c, or may include a sliding layer (not shown) on the inner peripheral surface side of the base layer 41b.

A pressurizing roller 44 serving as a pressurizing member, which is arranged to face the fixing belt 41, includes a mandrel 44-1 and an elastic layer 44-3 on the outer peripheral surface of the mandrel 44-1. The elastic layer 44-3 contains, for example, a heat-resistant rubber, such as a silicone rubber or a fluorine rubber. The elastic layer may be a solid layer or a foam layer. Both the end portions of the mandrel 44-1 of the pressurizing roller 44 are rotatably supported with bearings. The fixing belt 41 and the ceramic heater 43 are pressed against the pressurizing roller 44 by a pressing member (not shown). In addition, when the ceramic heater 43 and the pressurizing roller 44 are brought into contact with each other through the fixing belt 41, a fixing nip portion N having a predetermined width, the portion serving as a portion for heating unfixed toner images T on the recording material P, is formed.

The pressurizing roller 44 is rotationally driven by a driving unit (not shown) in a counterclockwise direction indicated by the arrow A2 at a predetermined rotational peripheral speed. A frictional force in the fixing nip portion N between the pressurizing roller 44 and the fixing belt 41 caused by the rotational driving of the pressurizing roller 44 applies a rotational force to the fixing belt 41. Then, the fixing belt 41 rotates following the rotational driving in a clockwise direction indicated by the arrow A1 while sliding in close contact with the downward surface of the heater 43. The supporting member (heater holder) 46 also serves as a member for guiding the rotation of the cylindrical fixing belt 41.

The pressurizing roller 44 is rotationally driven, and the fixing belt 41 rotates following the rotational driving. In addition, under a state in which the temperature of the ceramic heater 43 is adjusted to a predetermined fixation temperature, the recording material P bearing the unfixed toner images T is introduced into the fixing nip portion N. Then, in the fixing nip portion N, the surface of the recording material P bearing the unfixed toner images T is brought into close contact with the outer surface of the fixing belt 41, and the recording material is interposed and conveyed into the fixing nip portion N together with the fixing belt 41. In the interposition and conveyance process, the recording material P is heated by the heat of the fixing belt 41 heated by the heater 43, and hence the unfixed toner images T on the recording material P are heated and pressurized to be fixed to the recording material P. The recording material P that has passed through the fixing nip portion N is separated from the outer surface of the fixing belt 41, and is discharged from the nip portion N in a direction indicated by the arrow A3.

The temperature of the fixing belt 41 heated by the ceramic heater 43 is measured by a contact-type temperature gauge serving as a contact-type thermistor 45, and the temperature of the fixing belt 41 can be controlled by a temperature-controlling unit (not shown) in accordance with the detected temperature.

Next, the fixing belt is described in detail.

The fixing belt 41 according to at least one aspect of the present disclosure, which is illustrated in FIG. 3, has an endless shape. In addition, the belt includes the base layer 41b, the elastic layer 41c covering the outer surface thereof, and the surface layer 41a positioned on the surface side of the elastic layer 41c opposite to a side facing the base layer 41b. The belt may include an adhesion layer (not shown) for fixing the surface layer 41a onto the elastic layer 41c between the surface layer 41a and the elastic layer 41c.

(1) Base Layer

A material for the base layer 41b is not particularly limited, and a known material to be used as the base layer of a fixing belt may be adopted. For example, metals and alloys, such as aluminum, iron, stainless steel, and nickel, and heat-resistant resins such as polyimide are each used. Although the thickness of the layer is not particularly limited, the thickness is preferably set to 20 μm or more and 100 μm or less from the viewpoints of, for example, the strength, flexibility, and heat capacity thereof.

The outer surface of the base layer 41b may be subjected to surface treatment for imparting an adhesive property with the elastic layer 41c. Physical treatment, such as blasting treatment, lapping treatment, and polishing, and chemical treatment, such as oxidation treatment, coupling agent treatment, and primer treatment, may be used in alone or in combination thereof as the surface treatment.

When the elastic layer 41c containing a silicone rubber is arranged on the surface of the base layer 41b, the surface of the base layer 41b is preferably subjected to primer treatment for improving an adhesive property between the base layer 41b and the elastic layer 41c. A primer to be used in the primer treatment is, for example, a paint obtained by appropriately blending and dispersing a silane coupling agent, a silicone polymer, hydrogenated methylsiloxane, an alkoxysilane, a reaction-accelerating catalyst, and a colorant such as red oxide in an organic solvent. The primer may be appropriately selected in accordance with the material for the base layer, the kind of the elastic layer, or the form of the crosslinking reaction of the rubber. In particular, when the elastic layer contains a large amount of an unsaturated aliphatic group, a primer containing a hydrosilyl group is suitably used for imparting the adhesive property through its reaction with the unsaturated aliphatic group. When the elastic layer contains a large amount of a hydrosilyl group, a primer containing an unsaturated aliphatic group is suitably used.

In addition to the foregoing, a primer containing an alkoxy group is also available as the primer. A commercial product may be used as the primer. In addition, the primer treatment includes a step of applying the primer to the outer surface (surface bonded to the elastic layer) of the base layer, followed by its drying or calcination.

(2) Elastic Layer

The elastic layer 41c is sandwiched between the surface layer 41a and the base layer 41b, and its thickness is 200 μm or more. When the thickness of the entirety of the elastic layer is set to 200 μm or more, in the case where the fixing belt is incorporated into the fixing device, a sufficient nip width can be secured. Although the upper limit of the thickness of the elastic layer is not particularly limited, the thickness is preferably set to, for example, 3 mm (3,000 μm) or less. When the thickness of the elastic layer is set to 3 mm or less, the flexibility of the fixing belt can be more reliably maintained. That is, the thickness of the elastic layer is preferably 200 μm or more and 3,000 μm or less, more preferably from 350 μm to 3,000 μm.

A material for the elastic layer is not particularly limited, and a known material to be used as the elastic layer of a fixing belt such as a rotating body for fixation may be adopted. A silicone rubber excellent in heat resistance is preferably incorporated into the elastic layer. In addition, an addition-curable liquid silicone rubber is preferably used as a raw material for the silicone rubber.

The thermal conductivity of the entirety of the elastic layer in its thickness direction is 0.4 W/(m·K) or more. When the thermal conductivity in the thickness direction is 0.4 W/(m·K) or more, the layer has a sufficient heat transfer property. Although the upper limit of the thermal conductivity is not particularly limited, the thermal conductivity is preferably, for example, 2.0 W/(m·K) or less from the viewpoint of maintaining the flexibility of the elastic layer. The thermal conductivity of the elastic layer in the thickness direction is preferably from 0.4 W/(m·K) to 2.0 W/(m·K), particularly preferably from 0.80 W/(m·K) to 1.50 W/(m·K).

The elastic layer contains a rubber serving as a binder and fillers dispersed in the rubber. A material for the rubber is not particularly limited, and a known material to be used as the elastic layer of a fixing belt may be adopted. However, a silicone rubber excellent in heat resistance is preferably incorporated. In addition, an addition-curable liquid silicone rubber is preferably used as a raw material for the silicone rubber.

To achieve the above-mentioned thermal conductivity of the elastic layer in the thickness direction (0.4 W/(m·K) or more), at least high-thermal conductivity filler particles are preferably incorporated as the fillers. Although a material for such high-thermal conductivity filler is not particularly limited, for example, inorganic matter, in particular, a metal or a metal compound is available. Specific examples of the high-thermal conductivity filler include particles formed of the following materials.

Silicon carbide (SiC), silicon nitride ($Si_3N_4$), boron nitride (BN), aluminum nitride (AlN), alumina ($Al_2O_3$), zinc oxide (ZnO), magnesium oxide (MgO), silica (Sift), copper (Cu), aluminum (Al), silver (Ag), iron (Fe), nickel (Ni), carbon black (C), a carbon fiber (C), and a carbon nanotube (C). Each of those particles may be used alone, or any two or more kinds thereof may be used as a mixture.

The content ratio of the fillers with respect to the entirety of the elastic layer is set to from 40 vol % to 60 vol %. When the content ratio of the fillers with respect to the entirety of the elastic layer is 40 vol % or more, the elastic layer can more easily achieve a thermal conductivity of 0.4 W/(m·K) or more in the thickness direction. In addition, when the content ratio of the fillers with respect to the entirety of the elastic layer is 60 vol % or less, an excessive increase in hardness of the entirety of the elastic layer can be prevented. A method of measuring the content of the fillers in the elastic layer is described later.

<Method of measuring Content Ratio of Fillers in Elastic Layer>

An example of a method of measuring the volume ratio of the fillers incorporated into the elastic layer is described. First, the base layer and the surface layer are peeled from the fixing belt, and only the elastic layer is left. The specific gravity of the elastic layer is measured with a specific gravity meter. The volume fraction of the fillers is calculated by using the result, and the specific gravity of the binder of the elastic layer and the specific gravities of the fillers thereof. For example, an automatic specific gravity meter (product name: DSG-1, manufactured by Toyo Seiki Seisaku-sho, Ltd.) may be used as the specific gravity meter.

In addition, the volume fraction of the filler in the region A and the volume ratio of the filler in the region B may be identified by using a thermogravimetric analyzer (TGA) (e.g., a product available under the product name "TGA851" from Mettler-Toledo International Inc.). That is, 20 mg of a sample, which has been cut out of each of the region A and the region B with a razor or the like, is precisely weighed, and is loaded into an alumina pan to be used in the thermogravimetric analyzer. The alumina pan containing the sample is set in the thermogravimetric analyzer, and is heated from room temperature to 800° C. at a rate of temperature increase of 20° C. per minute under a nitrogen atmosphere. Further, the temperature is kept constant at 800° C. for 1 hour. In the nitrogen atmosphere, a component except the filler particles is decomposed and removed by cracking along with the temperature increase, and hence the mass of the sample reduces. As a result, the mass of the filler particles in the sample can be calculated. Then, the specific gravity of the binder of the elastic layer and the specific gravities of the fillers, and the content (volume ratio) of the heat conductive filler particles in each region of the elastic layer are calculated.

<Shapes of Fillers>

Next, the influence of the shapes of the fillers on rupture in the interfacial region of the elastic layer on a side close to the base layer, and the influence thereof on the thermal conductivity of the entirety of the elastic layer are described.

As described above, when the filler in the elastic layer is nonspherical, a stress locally concentrates on the nonspherical filler at the time of the occurrence of strain in the elastic layer, and hence the rupture of the rubber in the elastic layer is liable to occur.

Meanwhile, when the filler in the elastic layer is a filler having a spherical shape or a shape close to a spherical shape, a heat conductive path is hardly formed by the filler in the elastic layer. As a result, it becomes difficult to sufficiently increase the thermal conductivity of the elastic layer in the thickness direction. In other words, from the viewpoint of preventing the rupture in the interfacial region of the elastic layer with the base layer, the shape of the filler is preferably a spherical shape or a shape close to a spherical shape, and from the viewpoint of imparting high thermal conductivity in the thickness direction of the elastic layer, the shapes of the filler particles are each preferably a nonspherical shape.

In the fixing belt according to one aspect of the present disclosure, a filler having a practical sphericity SA of 0.75 or more, that is, having a spherical shape or a shape close to a spherical shape is used as the filler incorporated into the region A of the elastic layer. Thus, the rupture of the rubber in the interfacial region of the elastic layer on the base layer side in which strain is more liable to be accumulated can be prevented.

Meanwhile, a nonspherical filler having a practical sphericity SB of less than 0.75 is used as the filler incorporated into the region B of the elastic layer. Thus, a high thermal conductivity can be imparted to the elastic layer in the thickness direction.

The region A and region B of the elastic layer are described in detail below.

<Region A>

The range from the interface between the base layer and the elastic layer to a depth of 50 μm in the thickness direction of the elastic layer is regarded as the region A. The practical sphericity representing the shape of the filler incorporated into the region A is set to 0.75 or more, and the content ratio of the filler incorporated into the region A with respect to the region A is set to 60 vol % or less.

When the content ratio of the filler in the region A is 60 vol % or less, and the practical sphericity of the filler in the region A is 0.75 or more, peeling at the interface between the elastic layer and the base layer in the fixing step can be more reliably prevented. The reason for the foregoing is assumed to be as described below. First, when the content ratio is 60 vol % or less, the embrittlement of the region of the elastic layer on the side close to the base layer can be effectively prevented. In addition, the fact that the practical sphericity of the filler is 0.75 or more means that the filler has a spherical shape or a shape close to a spherical shape. In addition, when the region A contains such filler, the following can be prevented: when strain is accumulated in the interfacial region of the elastic layer with the base layer, the strain concentrates on a specific site of the filler to rupture the rubber in the elastic layer. Probably as a result of the foregoing, the peeling of the elastic layer from the base layer can be effectively prevented.

The content ratio of the filler incorporated into the region A with respect to the region A is preferably from 20 vol % to 60 vol %. In addition, the practical sphericity of the filler incorporated into the region A is preferably from 0.75 to 0.93. A method of calculating the practical sphericity is described later.

The particle diameter D50 of the filler incorporated into the region A is preferably from 5 μm to 30 μm. When the particle diameter D50 falls within the above-mentioned range, it becomes easier to set the thermal conductivity of the elastic layer in the thickness direction to 0.4 W/(m·K) or more.

Specific examples of the filler in the region A include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), a carbon fiber (C), and a carbon nanotube (C).

Of those, at least one selected from the group consisting of: titanium oxide; and alumina is suitably used.

<Method of calculating Practical Sphericity SA of Filler in Region A>

A nonlimitative method of calculating the practical sphericity SA of the filler in the region A is described.

Step (A-1): A sample is removed from the above-mentioned region A of the elastic layer of the fixing belt.

Step (A-2): The sample collected in the step (A-1) is immersed in a silicone-dissolving agent so that its silicone rubber may be dissolved, followed by the removal of the filler from the dissolved liquid. Here, the silicone-dissolving agent is, for example, "eSOLVE 21RS" (product name, manufactured by Kaneko Chemical Co., Ltd.).

Step (A-3): The value (DA) of the particle diameter D50 of the removed filler is measured with a particle counter/analyzer, and the particle volume (VA) thereof is calculated by using the following equation (1). Here, the particle counter/analyzer is, for example, a Coulter-type particle counter/analyzer (product name: CDA-1000, manufactured by Sysmex Corporation). In addition, the volume of the circumsphere of the filler is calculated from an average obtained as follows: the maximum lengths of several hundreds to several thousands of particles of the filler are obtained with a flow-type particle image analyzer, and their arithmetic average (dAmax) is calculated. Here, the flow-type particle image analyzer is, for example, "FPIA-3000" (product name, manufactured by Sysmex Corporation). In addition, the volume VAe of the circumsphere of the filler is calculated from the following equation (2). Methods of measuring and calculating the volume of each of the particles and the volume of the circumsphere are not limited, and the volumes may be measured through, for example, observation with an electron microscope.

$$VA = (4/3)\pi DA^3 \qquad \text{Equation (1)}$$

$$VAe = (4/3)\pi dAmax^3 \qquad \text{Equation (2)}$$

Then, the practical sphericity SA of the filler in the region A is derived from the following equation (3) by using the VA and the VAe.

$$SA = (VA/VAe)^{(1/3)} \qquad \text{Equation (3)}$$

<Region B>

When the range corresponding to a depth of 50 μm or more from the interface between the base layer and the elastic layer in the thickness direction of the elastic layer is regarded as the region B, the practical sphericity representing the shape of the filler incorporated into the region B is set to less than 0.75, and the content of the filler incorporated into the region B is set to 40 vol % or more.

When the content ratio of the filler in the region B with respect to the region B is 40 vol % or more, and the practical sphericity of the filler in the region B is less than the entirety of the elastic layer can more easily achieve a thermal conductivity of W/(m·K) or more. A possible reason for the foregoing is as follows: when the region B contains a certain amount or more of the filler, and in addition, the filler in the region B is nonspherical, a conductive path is more efficiently formed by the filler in the region B.

The content ratio of the filler in the region B with respect to the region B preferably falls within the range of from 40 vol % to 63 vol %. In addition, the practical sphericity of the filler in the region B preferably falls within the range of from 0.29 or more to less than 0.75.

The particle diameter D50 of the filler incorporated into the region B is preferably from 5 μm to 30 μm. When the particle diameter D50 falls within the above-mentioned range, it becomes easier to set the thermal conductivity of the elastic layer in the thickness direction to 0.4 W/(m·K) or more.

Specific examples of the filler in the region B include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), a carbon fiber (C), and a carbon nanotube (C).

Of those, boron nitride is suitably used.

<Method of Calculating Practical Sphericity SB of Filler in Region B>

A nonlimitative method of calculating the practical sphericity SB of the filler in the region B is described.

Step (B-1): A sample is removed from the above-mentioned region B of the elastic layer of the fixing belt.

Step (B-2): The filler in the region B is removed in the same manner as in the step (A-2).

Step (B-3): The value (DB) of the particle diameter D50 of the removed filler in the region B is measured with a Coulter-type particle counter/analyzer, and the particle volume VB thereof is calculated by using the following equation (4). The volume of the circumsphere of the filler is calculated as follows: the arithmetic average of the maximum lengths (dBmax) of several hundreds to several thousands of particles of the filler is measured with a flow-type particle image analyzer, and the volume VBe of the circumsphere of the filler is calculated from the following equation (5). Methods of measuring and calculating the volume of each of the particles and the volume of the circumsphere are not limited, and the volumes may be measured through, for example, observation with an electron microscope.

$$VB=(4/3)\pi DB^3 \qquad \text{Equation (4)}$$

$$VBe=(4/3)\pi dBmax^3 \qquad \text{Equation (5)}$$

The practical sphericity SB of the filler in the region B is derived from the following equation (6) by using the VB and the VBe.

$$SB=(VB/VBe)^{(1/3)} \qquad \text{Equation (6)}$$

The particle diameter D50 of the filler incorporated into the region A and the particle diameter D50 of the filler incorporated into the region B are each preferably from 5 μm to 30 μm.

<Hardness of Elastic Layer>

The type durometer hardness of the elastic layer measured based on Japanese Industrial Standard (JIS) K 6253-3:2012 is preferably from 9° to 25°. When the hardness falls within the above-mentioned range, the followability of the elastic layer to a recording material in the fixing step can be further improved. The hardness of the elastic layer only needs to be measured, for example, as follows: the elastic layer is cut out of the fixing belt, and the resultant pieces are superimposed on each other so that a thickness needed for the measurement may be obtained, followed by the measurement of the hardness for the surface layer side of the elastic layer based on JIS K 6253-3:2012. A type E durometer for low hardness or a type A durometer for medium hardness is used as a tester to be used in the measurement of the durometer hardness. Specifically, for example, when a durometer hardness measured with the type E durometer is more than 20° (A20), the measurement is preferably performed again with the type A durometer.

<Method of measuring Thermal Conductivity of Elastic Layer in Thickness Direction>

A nonlimitative method of measuring the thermal conductivity of the elastic layer in the thickness direction is described. The thermal conductivity λ of the elastic layer in the thickness direction is calculated from the following equation:

$$\lambda = \alpha \times Cp \times p$$

where λ represents the thermal conductivity (W/(m·K)) of the elastic layer in the thickness direction, a represents the thermal diffusivity ($m^2$/s) thereof in the thickness direction, Cp represents the specific heat at constant pressure (J/(kg·K)) thereof, and p represents the density (kg/$m^3$) thereof. Here, the respective values of the thermal diffusivity α in the thickness direction, the specific heat at constant pressure Cp, and the density p are determined by the following methods.

Thermal Diffusivity α

The thermal diffusivity α of the elastic layer in the thickness direction is measured with a periodical heating method thermal diffusivity measurement system (product name: FTC-1, manufactured by Advance Riko, Inc.) at room temperature (25° C.). A rectangular sample piece measuring 8 mm by 12 mm is cut out of the elastic layer with a cutter, and a total of 5 sample pieces are produced. The thickness of each of the sample pieces is measured with a digital length measuring system (product name: DIGIMICRO (trademark) MF-501, flat probe: ϕ4 mm; manufactured by Nikon Corporation). Next, the thermal diffusivity α of each of the sample pieces is measured with the periodical heating method thermal diffusivity measurement system a total of five times, and the average ($m^2$/s) of the measured values is determined. The measurement is performed while the sample piece is pressurized with a weight of 1 kg.

Specific Heat at Constant Pressure Cp

The specific heat at constant pressure of the elastic layer is measured with a differential scanning calorimeter (product name: DSC823e, manufactured by Mettler-Toledo International Inc.). Specifically, aluminum-made pans are used as a pan for a sample and a reference pan. First, as blank measurement, under a state in which both the pans are empty, measurement is performed by the following program: a temperature in the calorimeter is kept constant at 15° C. for 10 minutes; and then, the temperature is increased to 215° C. at a rate of temperature increase of 10° C./min, and is further kept constant at 215° C. for 10 minutes. Next, measurement is performed by the same program through use of 10 mg of synthetic sapphire whose specific heat at constant pressure is known as a reference substance. Next, a measurement sample whose amount is the same as that of the synthetic sapphire serving as the reference substance, that is, 10 mg is cut out of the elastic layer, and is then set in the pan for a sample, followed by the performance of measurement by the same program. Those measurement results are analyzed with specific heat analysis software attached to the above-mentioned differential scanning calorimeter, and the specific heat at constant pressure Cp at a temperature of 25° C. is calculated from the average of the 5 measurement results.

Density $\rho$

The density of the elastic layer is measured with a dry automatic densimeter (product name: ACCUPYC 1330-01, manufactured by Shimadzu Corporation). Specifically, a sample cell having a volume of 10 cm$^3$ is used, and a sample piece is cut out of the elastic layer so as to account for about 80% of the volume of the cell. The mass of the sample piece is measured, and then the sample piece is loaded into the sample cell. The sample cell is set in a measuring portion in the densimeter, and helium is used as a gas for measurement. After the cell has been purged with the gas, the volume of the sample piece is measured 10 times. The density of the elastic layer is calculated from the mass of the sample piece and the measured volume for each measurement, and the average of the calculated values is determined. Thus, the thermal conductivity $\lambda$ of the elastic layer in the thickness direction is calculated from the specific heat at constant pressure Cp (J/(kg·K)) and density $\rho$ (kg/m$^3$) of the elastic layer each of which has been subjected to unit conversion, and the measured thermal diffusivity $\alpha$ (m$^2$/s).

<Dispersed State of Filler in Region A>

In the region A, distances between the wall surfaces of the particles of the filler are preferably uniformized. When the distances between the wall surfaces of the particles of the filler are uniform, the concentration of a stress on a specific portion at the time of the accumulation of strain in the region A can be prevented. As a result, even when a larger amount of strain is accumulated in the interfacial region of the elastic layer, a preventing effect on the rupture of the rubber in the interfacial region can be further improved.

In the present disclosure, as one indicator of the fact that the distances between the wall surfaces of the particles of the filler are uniform, there is used the coefficient of variation of the areas of Voronoi regions when the Voronoi regions are formed by performing Voronoi tessellation through use of the filler exposed to a section in a direction perpendicular to the peripheral direction of the elastic layer as a generator.

The Voronoi tessellation is described. When a plurality of points (hereinafter also referred to as "generators") are present in an image region, all the adjacent generators are connected with straight lines, and a perpendicular bisector is produced for each basic straight line connecting the two generators adjacent to each other. When the perpendicular bisectors extending from the basic straight lines adjacent to each other are linked to each other, a region in which one generator is surrounded by a plurality of perpendicular bisectors is produced. The region surrounded by the perpendicular bisectors is referred to as "Voronoi region." The point of intersection of the straight line connecting the two adjacent generators and its perpendicular bisector represents the shortest distance from each of the generators, and the size (area) of the Voronoi region formed by being surrounded by these perpendicular bisectors represents a distance between the adjacent generators. Accordingly, a smaller coefficient of variation of the areas of the Voronoi regions means that the distances between the adjacent generators are more uniform.

In the present disclosure, the filler is used as the generator of the Voronoi tessellation. The tessellation is performed by a method including using an edge of the filler as a reference.

In the tessellation including using the edge of the filler as a reference, a straight line having the shortest distance out of straight lines connecting the respective edge portions of two heat conductive filler particles adjacent to each other is selected, and a region formed by being surrounded by perpendicular bisectors for such straight lines serves as the Voronoi region. Specifically, the tessellation is performed by the following method.

<Calculation of Coefficient of Variation $Av_{ave}$ of Areas of Voronoi Regions in Region A>

Figure 4A:
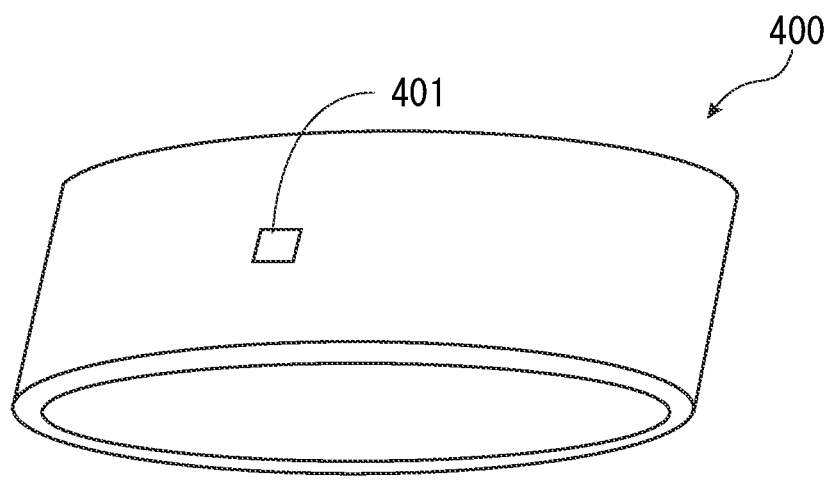
FIG. 4A and FIG. 4B are views for illustrating the first section and second section of the elastic layer of a belt-shaped fixing belt, respectively.
Figure 4B:
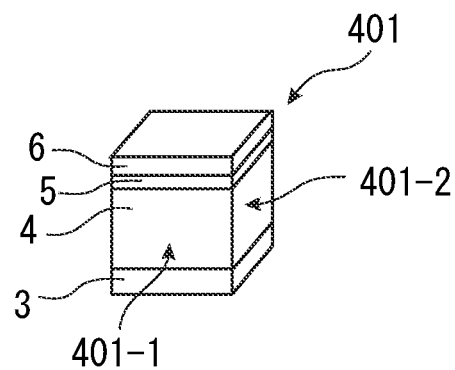

Step (V-1): An observation sample of a section of the elastic layer is produced. For example, in the case of such a fixing belt 400 as illustrated in FIG. 4A, a total of 10 samples 401 each having the following dimensions are collected from 10 arbitrary sites of the fixing belt: as illustrated in FIG. 4B, each of the samples measures 5 mm long by 5 mm wide, and has a thickness corresponding to the total thickness of the fixing belt. The samples 401 thus cut out are each a laminate of a surface layer 6, an adhesion layer 5, an elastic layer 4, and a base layer 3. The samples 401 each have a first section 401-1 in the thickness-peripheral directions of the fixing belt, and a second section 401-2 in the thickness-axial directions of the fixing belt. In each of 5 samples out of the resultant 10 samples, a section including the first section 401-1 is subjected to polishing processing with an ion beam. In addition, in each of the remaining 5 samples, a section including the second section 401-2 is subjected to polishing processing with an ion beam. For example, a cross section polisher may be used in the polishing processing of a section with an ion beam. In the polishing processing of a section with an ion beam, the falling of the filler particles from the sample and the inclusion of a polishing agent can be prevented, and a section having a small number of polishing marks can be formed.

Figure 5:
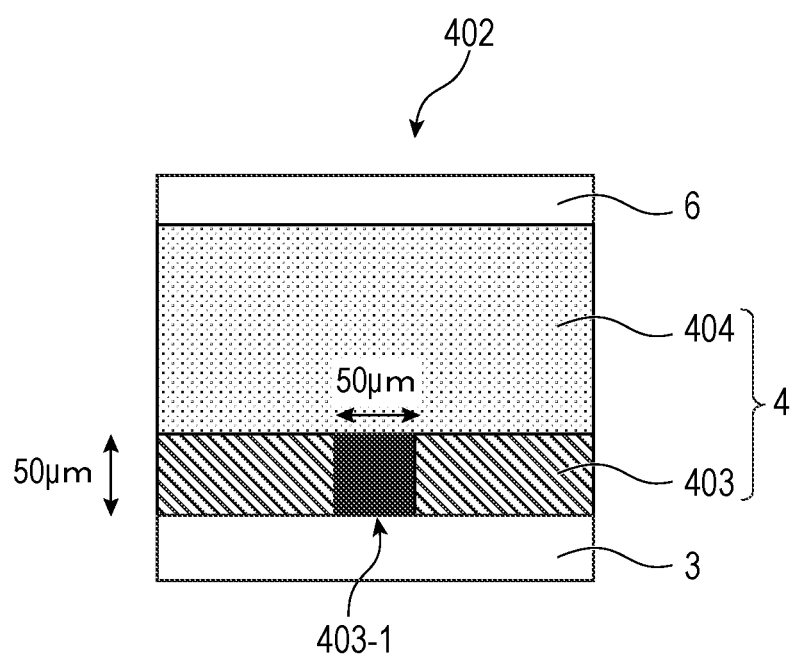
FIG. 5 is a schematic view of a section of the fixing belt.

Step (V-2): For the 5 samples in each of which the first section 401-1 of the elastic layer has been subjected to the polishing processing, and the 5 samples in each of which the second section 401-2 of the elastic layer has been subjected to the polishing processing, the first section of the elastic layer and the second section of the elastic layer are observed with a scanning electron microscope (SEM) or the like. For example, when the sections are each a section 402 illustrated in FIG. 5, a SEM image of a square region 403-1 measuring 50 μm by 50 μm is obtained from an arbitrary place in the region A (represented by reference symbol 403 in FIG. 5) from the surface of the elastic layer 4 on a side facing the base layer 3 to a depth of 50 μm toward the opposite surface. In the section 402 illustrated in FIG. 5, the elastic layer 4 is formed of the region A represented by reference symbol 403 in FIG. 5 and the region B represented by reference symbol 404 therein.

Step (V-3): The resultant SEM image (FIG. 6A) is subjected to binarization processing with commercial image processing software so that portions corresponding to filler particles 61 may be white, and an elastic layer portion may be black. Thus, a binarized image is obtained (FIG. 6B). For example, Otsu's method may be used as an approach for the binarization. The image processing software that can perform such binarization processing is, for example, "ImageJ" (product name, manufactured by the National Institutes of Health (NIH)).

Step (V-4): The white portions of the resultant binarized image are segmented with watershed algorithm. The step is performed for preventing the plurality of filler particles present close to each other from being recognized as if the particles were a single filler.

Step (V-5): The regions subjected to the segmentation with the watershed algorithm, which has been performed in the above-mentioned step (V-4), are subjected to Voronoi tessellation. Specifically, the Voronoi tessellation is performed by the following procedure. The positions of the centers of gravity (points A in FIG. 6C) of the respective white portion regions are calculated. All the centers of gravity of the adjacent white portion regions are connected with straight lines, and the straight lines are regarded as basic straight lines, followed by the calculation of the positions of the points of intersection (points F in FIG. 6C) of the outer peripheries of the respective segmented regions of the white portions and the basic straight lines. The two points of intersection F are typically produced on one straight line connecting the centers of gravity, and a perpendicular bisector between the two points of intersection is produced, and is regarded as a dividing line. When the adjacent portions are brought into contact with each other, the only one point of intersection F may be produced, but in such case, a line that is perpendicular to the basic straight line and passes through the point of intersection F is produced, and is regarded as a dividing line. When the dividing lines produced from the adjacent white portion regions are linked to each other, a region surrounded by the dividing lines is produced so as to surround each of the white regions (FIG. 6D). In this embodiment, the produced region is defined as a Voronoi region. The Voronoi region may be utilized as a region representing the distribution of distances between the particles of the filler. The areas of the respective Voronoi regions are calculated, and their arithmetic average and standard deviation are represented by Aave and Aσ, respectively. In this case, a value obtained by dividing the Aσ by the Aave is defined as a coefficient of variation Av (=Aσ/Aave).

The 10 SEM images obtained in the above-mentioned step (V-2) are subjected to the above-mentioned steps (V-3) to (V-6), and their respective coefficients of variation Av are calculated. The average of the calculated values is regarded as an $Av_{ave}$, and is used as the coefficient of variation of the areas of the Voronoi regions in the region A according to the present disclosure.

In the present disclosure, the coefficient of variation of the areas of the Voronoi regions calculated by the above-mentioned method is preferably 1.5 or less, particularly preferably 1.2 or less. When the coefficient of variation of the areas of the Voronoi regions is 1.5 or less, the distances between the wall surfaces of the particles of the filler are uniformized. Thus, when a stress is applied to the elastic layer, the concentration of the stress on a specific site can be alleviated, and hence a further improvement in durability of the elastic layer can be achieved.

(3) Surface Layer

The surface layer 41a contains a tetrafluoroethylene-perfluoroalkyl vinyl ether copolymer (PFA) and perfluoropolyether (PFPE). A fluorine resin material having a thickness of 100 µm or less, preferably from 10 µm to 70 µm may be used. Examples of the fluorine resin material include polytetrafluoroethylene (PTFE), fluorinated ethylene propylene (FEP), and PFA.

<Method of producing Fixing Belt>

A nonlimitative method of producing the fixing belt according to at least one aspect of the present disclosure is described. The production method includes, for example, the following steps (P-1) to (P-8).

Step (P-1): Abase layer is prepared.

Step (P-2): A first paint for forming a first rubber layer containing an uncrosslinked rubber and a first filler is prepared. Herein, the first filler is a filler having a practical sphericity SA of 0.75 or more. In addition, the content of the first filler in the first paint is adjusted to 60 vol % or less with respect to a cured film of a coating film of the first paint, and in its relationship with the amount of a filler incorporated into a second paint to be prepared in a step (P-5) to be described later, the amount of the fillers in an elastic layer to be finally formed is adjusted so as to fall within the range of from 40 vol % to 60 vol % with respect to the elastic layer.

Step (P-3): The first paint is applied onto the base layer to form a first coating film. The paint is applied in such a thickness that the thickness of the first coating film after its curing becomes 50 µm.

Step (P-4): The first coating film is precured. This step is a step of temporarily curing the first coating film so that the thickness of the first coating film may not change at the time of the formation of a second coating film according to a step (P-6) to be described later on the first coating film. For example, when the first coating film contains an addition-curable liquid silicone rubber, conditions for the precuring may be set as follows: the coating film is precured at a temperature of from 100° C. to 150° C. for from about 10 minutes to about 2 hours.

Step (P-5): A second paint for forming a second rubber layer containing an uncrosslinked rubber and a second filler is prepared. Herein, the second filler is a filler having a practical sphericity SA of less than 0.75. In addition, the content of the second filler in the second paint is adjusted to 40 vol % or more with respect to a cured film of a coating film of the second paint, and in its relationship with the amount of the filler incorporated into the first paint prepared in the step (P-2), the amount of the fillers in the elastic layer to be finally formed is adjusted so as to fall within the range of from 40 vol % to 60 vol % with respect to the elastic layer. In addition, the amount of the fillers in the elastic layer is adjusted so that the thermal conductivity of the elastic layer in its thickness direction may be 0.4 W/(m·K) or more.

Step (P-6): The second paint is applied onto the outer surface of the precured first coating film obtained in the step (P-4) to form a second coating film. The second paint is applied so that the thickness of the second coating film after its curing may be a thickness obtained by subtracting the thickness of the cured film of the first coating film, that is, 50 µm from the desired thickness of the elastic layer.

Step (P-7): The first coating film and the second coating film are postcured to form the elastic layer. For example, when the first coating film and the second coating film each contain an addition-curable liquid silicone rubber, conditions for the postcuring may be set as follows: the coating films are postcured at a temperature of from 180° C. to 200° C. for from 2 hours to 4 hours.

Step (P-8): A surface layer is formed on the outer surface of the elastic layer obtained through the step (P-7). Examples of a method of forming the surface layer include: a method including covering the elastic layer with a tube containing a fluorine resin; and a method including applying fluorine resin particles onto the elastic layer, and then melting the fluorine resin particles to form a surface layer containing a fluorine resin.

A fixing belt including the elastic layer formed of the region A and the region B can be obtained through the above-mentioned steps (P-1) to (P-8).

In addition, in order to reduce the coefficient of variation Avave of the region of the Voronoi region in the region A to 1.5 or less, especially to 1.2 or less, it is preferable that the dispersion state of the first filler in the first paint is made more sophisticated in the process of preparing the first paint (P-2). Non-limiting methods for making the dispersion state of the first filler more sophisticated in the first paint include, for example, the following methods.
<Method>
In the process (P-2), a predetermined amount of the first filler is added to the uncrosslinked rubber, pre-dispersion is performed for 0.5 to 2 hours by using a planetary mixer, and then kneading is performed for 5 or more passes by using a three-roll mill.

Also, in the above method, Avave can be reduced to a smaller value, e.g., 1.2 or less, by at least one operation selected from the group consisting of reducing the amount to be provided for one treatment and increasing the number of passes during kneading in a three-roll mill.

According to at least one aspect of the present disclosure, there can be obtained the fixing belt, which hardly causes peeling between its base layer and elastic layer even when a large peel force is applied thereto. In addition, according to at least one aspect of the present disclosure, there can be obtained the heat fixing device conducive to stable formation of a high-quality electrophotographic image.

EXAMPLES

The fixing belt according to the present disclosure is described in more detail below by way of Examples and Comparative Examples. The fixing belt according to the present disclosure is not limited to configurations embodied in Examples. In addition, unless otherwise stated, commercially available first-grade or special-grade reagents were used as chemicals to be used. In addition, in Examples, the term "part(s)" means "part(s) by mass" unless otherwise stated.
<Preparation of Fillers 1 to 12>
The following three kinds were prepared as filler raw materials.
  Spherical alumina (product name: Alunabeads CB-A30S; manufactured by Showa Denko K.K., practical sphericity=0.81)
  Titanium oxide (product name; JR-1000; manufactured by Tayca Corporation, practical sphericity=0.70)
  Boron nitride (SHOBN UHP-2; manufactured by Showa Denko K.K., practical sphericity=0.29)
Then, each of the above-mentioned three kinds of filler raw materials was subjected to sphering treatment and classification treatment, or to classification treatment.

A filler 1 is a filler obtained by: subjecting titanium oxide to sphering treatment so that its practical sphericity may be 0.75; and subjecting the treated product to classification treatment so that its particle diameter D50 may be 4 μm.

A filler 2 is a filler obtained by subjecting boron nitride to classification treatment so that its particle diameter D50 may be 4 μm.

A filler 3 is a filler obtained by: subjecting alumina to sphering treatment so that its practical sphericity may be 0.93; and subjecting the treated product to classification treatment so that its particle diameter D50 may be 4 μm.

A filler 4 is a filler obtained by: subjecting titanium oxide to sphering treatment so that its practical sphericity may be 0.75; and subjecting the treated product to classification treatment so that its particle diameter D50 may be 5 μm.

A filler 5 is a filler obtained by subjecting boron nitride to classification treatment so that its particle diameter D50 may be 5 μm.

A filler 6 is a filler obtained by: subjecting titanium oxide to sphering treatment so that its practical sphericity may be 0.75; and subjecting the treated product to classification treatment so that its particle diameter D50 may be 30 μm.

A filler 7 is a filler obtained by subjecting boron nitride to classification treatment so that its particle diameter D50 may be 30 μm.

A filler 8 is a filler obtained by: subjecting titanium oxide to sphering treatment so that its practical sphericity may be 0.75; and subjecting the treated product to classification treatment so that its particle diameter D50 may be 32 μm.

A filler 9 is a filler obtained by subjecting boron nitride to classification treatment so that its particle diameter D50 may be 32 μm.

A filler 10 is a filler obtained by subjecting boron nitride to classification treatment so that its particle diameter D50 may be 4 μm.

A filler 11 is a filler obtained by: subjecting titanium oxide to sphering treatment so that its practical sphericity may be 0.75; and subjecting the treated product to classification treatment so that its particle diameter D50 may be 5 μm and powder having a particle diameter of 2.4 μm or less may be removed.

A filler 12 is a filler obtained by subjecting boron nitride to classification treatment so that its particle diameter D50 may be 5 μm and powder having a particle diameter of 2.4 μm or less may be removed.

For each of the fillers 1 to 12, a material for the filler, the presence or absence of the sphering treatment, the presence or absence of the removal of particles each having a particle diameter of 2 μm or less, the practical sphericity, and the particle diameter D50 are shown in Table 1.

TABLE 1

| Kind of filler | Material | Practical sphericity | Sphering treatment | Particle diameter (D50) (μm) | Classification treatment |
|---|---|---|---|---|---|
| Filler 1 | Titanium oxide | 0.75 | Present | 4 | Present |
| Filler 2 | Boron nitride | 0.29 | Absent | 4 | Present |
| Filler 3 | Spherical alumina | 0.93 | Present | 4 | Present |
| Filler 4 | Titanium oxide | 0.75 | Present | 5 | Present |
| Filler 5 | Boron nitride | 0.29 | Absent | 5 | Present |

TABLE 1-continued

| Kind of filler | Material | Practical sphericity | Sphering treatment | Particle diameter (D50) (μm) | Classification treatment |
|---|---|---|---|---|---|
| Filler 6 | Titanium oxide | 0.75 | Present | 30 | Present |
| Filler 7 | Boron nitride | 0.29 | Absent | 30 | Present |
| Filler 8 | Titanium oxide | 0.75 | Present | 32 | Present |
| Filler 9 | Boron nitride | 0.29 | Absent | 32 | Present |
| Filler 10 | Titanium oxide | 0.7 | Absent | 4 | Present |
| Filler 11 | Titanium oxide | 0.75 | Present | 5 | Present (*Powder having a particle diameter of 2.4 μm or less is discarded.) |
| Filler 12 | Boron nitride | 0.29 | Absent | 5 | Present (*Powder having a particle diameter of 2.4 μm or less is discarded.) |

Example 1

(Method of Producing Fixing Belt)

Next, a method of producing a fixing belt used in Example 1 is described. In Example 1, such a fixing belt as illustrated in FIG. 3 was produced by a production method including steps J-1 to J-2.

(Step J-1)

A SUS-made base material having an endless belt shape having an inner diameter of 25 mm, a width of 400 mm, and a thickness of 40 μm was prepared as a base layer. The outer peripheral surface of the base material (base layer) was subjected to primer treatment.

(Step J-2)

The agent A and agent B of a filler-free and addition-curable liquid silicone rubber (product name: SE1886, manufactured by Dow Corning Toray Co., Ltd.) were prepared as raw materials for forming an elastic layer, and were mixed with each other. A mixing ratio was as follows: when the total amount of the mixture was set to 100 parts by volume, the amount of the agent A was 50 parts by volume, and the amount of the agent B was 50 parts by volume. The agent B contains a curing agent for the elastic layer, and the elastic layer can be cured by increasing the ratio of the agent B. 40.0 Parts by volume of the filler 1 was added to 100 parts by volume of the mixture. And after pre-dispersing for 2 hours by using a planetary mixer (trade name: PVM-50; Asada Iron Works Co., Ltd.), a three roll mill (trade name: SDX 600 CL; Bühler Co. Ltd.) was used for 5 passes of kneading. Thus, the first paint was prepared. The resultant first paint was applied onto the outer peripheral surface of the base material by using a ring coating method so that its thickness after curing became 50 μm. Thus, a first coating film was formed Next, the agent A and the agent B described above were mixed. A mixing ratio was as follows: when the total amount of the mixture was set to 100 parts by volume, the amount of the agent A was 50 parts by volume, and the amount of the agent B was 50 parts by volume. 51.7 Parts by volume of the filler 2 was added to 100 parts by volume of the mixed liquid silicone rubber, and the materials were sufficiently stirred and mixed to prepare a second paint. The resultant second paint was applied onto the outer surface of the precured first coating film by using a ring coating method so that its thickness after curing became 300 μm. Thus, a second coating film was formed. Next, the first coating film and the second coating film were heated at a temperature of 200° C. for 4 hours so that the silicone rubber in the first and second coating films was crosslinked. Thus, an elastic layer having an entire thickness of 350 μm was formed.

While the base layer having formed thereon the elastic layer was rotated in its peripheral direction at a moving speed of 20 mm/sec, the surface of the elastic layer was irradiated with UV light under an air atmosphere by using a UV lamp placed at a position distant from the surface of the elastic layer by a distance of 10 mm. A low-pressure mercury UV lamp (product name: GLQ500US/11, manufactured by Toshiba Lighting & Technology Corporation) was used as the UV lamp, and the irradiation was performed so that the integrated light quantity of light having a wavelength of 185 nm on an irradiation surface became 800 mJ/cm$^2$. Next, an addition-curable silicone rubber adhesive (obtained by mixing equal amounts of the "liquid A" and "liquid B" of an adhesive available under the product name "SE 1819 CV" from Dow Corning Toray Co., Ltd.) was applied to the outer surface of the elastic layer in a substantially uniform manner so that its thickness became about 20 μm.

Next, the resultant belt was covered with a fluorine resin tube (product name: 959HP-Plus, manufactured by Chemours-Mitsui Fluoroproducts Co., Ltd., thickness: 20 melting point: 306° C.) whose inner surface had been subjected to hydrophilic treatment, and the surface of the belt was uniformly squeezed from above the fluorine resin tube. Thus, the adhesive in excess was squeezed out of a space between the elastic layer and the fluorine resin tube. Then, the base layer covered with the elastic layer and the fluorine resin tube serving as a surface layer was loaded into an electric furnace whose temperature had been set to 200° C., and was heated for 1 hour so that the adhesive was cured to bond the fluorine resin tube onto the elastic layer, followed by the cutting of both the ends of the resultant. Thus, a fixing belt having a width of 350 mm was obtained.

Next, various physical properties of the elastic layer were measured.

<Thermal Conductivity of Elastic Layer in Thickness Direction>

The thermal conductivity λ of the elastic layer in its thickness direction was calculated from the following equation:

$$\lambda = \alpha \times Cp \times p$$

where λ represents the thermal conductivity of the elastic layer in the thickness direction (W/(m·K), α represents a thermal diffusivity in the thickness direction (m²/s), Cp represents a specific heat at constant pressure (J/(kg·K), and ρ represents a density (kg/m³).

The respective values of the thermal diffusivity α in the thickness direction, the specific heat at constant pressure Cp, and the density ρ were determined by the following methods.

Thermal Diffusivity α

The thermal diffusivity α of the elastic layer in the thickness direction was measured with a periodical heating method thermal diffusivity measurement system (product name: FTC-1, manufactured by Advance Riko, Inc.) at room temperature (25° C.). A rectangular sample piece measuring 8 mm by 12 mm was cut out of the elastic layer with a cutter, and a total of 5 sample pieces were produced. The thickness of each of the sample pieces is measured with a digital length measuring system (product name: DIGIMICRO (trademark) MF-501, flat probe: φ4 mm; manufactured by Nikon Corporation). Next, the thermal diffusivity α of each of the sample pieces is measured with the periodical heating method thermal diffusivity measurement system a total of five times, and the average (m²/s) of the measured values is determined. The measurement was performed while the sample piece was pressurized with a weight of 1 kg.

Specific Heat at Constant Pressure Cp

The specific heat at constant pressure of the elastic layer was measured with a differential scanning calorimeter (product name: DSC823e, manufactured by Mettler-Toledo International Inc.). Specifically, pans made of aluminum were used as a pan for a sample and a reference pan. First, as blank measurement, under a state in which both the pans were empty, measurement was performed by the following program: a temperature in the calorimeter was kept constant at 15° C. for 10 minutes, was then increased to 215° C. at a rate of temperature increase of 10° C./min, and was kept constant at 215° C. for 10 minutes. Next, measurement was performed through use of 10 mg of synthetic sapphire whose specific heat at constant pressure was known as a reference substance by the same program. Next, the same amount of a measurement sample as that of the synthetic sapphire serving as the reference substance, that is, 10 mg thereof was cut out of the elastic layer. After that, the sample was set in the pan for a sample, and measurement was performed by the same program. Those measurement results were analyzed with specific heat analysis software attached to the differential scanning calorimeter, and the specific heat at constant pressure Cp at a temperature of 25° C. was calculated from the average of the 5 measurement results.

Density ρ

The density of the elastic layer was measured with a dry automatic densimeter (product name: ACCUPYC 1330-01, manufactured by Shimadzu Corporation). Specifically, a sample cell having a volume of 10 cm³ was used, and a sample piece was cut out of the elastic layer so as to account for about 80% of the volume of the cell. The mass of the sample piece was measured, and then the sample piece was loaded into the sample cell. The sample cell was set in a measuring portion in the apparatus. Helium was used as a gas for measurement, and the cell was purged with the gas. After that, the volume of the sample piece was measured 10 times. The density of the elastic layer was calculated from the mass of the sample piece and the measured volume for each measurement, and the average of the calculated values was determined.

As can be seen from the foregoing, the thermal conductivity λ of the elastic layer in the thickness direction was calculated from the specific heat at constant pressure Cp (J/(kg·K)) and density ρ (kg/m³) of the elastic layer each of which had been subjected to unit conversion, and the measured thermal diffusivity α (m²/s).

<Method of calculating Practical Sphericity of Filler>

Next, the practical sphericities of the fillers added to the elastic layer were each calculated by the following method. 5 Grams of each of "a region A and a region B" was shaved from the elastic layer with a cutter. After that, the silicone resin component of each of the samples was dissolved by immersing the sample in eSOLVE 21RS (manufactured by Kaneko Chemical Co., Ltd.), and the residue was washed with toluene, followed by drying for 1 hour at normal temperature. Thus, the filler components in the elastic layer were removed.

The particle diameters of the removed filler components were measured with a Coulter-type particle size-measuring unit (CDA-1000, Sysmex Corporation), and the volume VB of each of the particles of each of the components was calculated from the particle diameter D50 of the particles on a volume basis by using the following equation (1).

$$VB = 4/3\pi(D50)^3 \quad (1)$$

In addition, the maximum lengths of several hundreds to several thousands of particles of each of the components were measured with a flow-type particle image analyzer (FPIA-3000, Malvern Panalytical Ltd.), and their arithmetic average was regarded as a maximum length Dmax, followed by the calculation of the volume VBe of the circumsphere of each of the particles through use of the following equation (2).

$$VBe = 4/3\pi(Dmax)^3 \quad (2)$$

The practical sphericity of each of the fillers in the elastic layer was calculated from the volume VB of each of the particles and the volume VBe of the circumsphere thus calculated by using the following equation (3).

$$\text{Practical sphericity} = (\text{volume } VB \text{ of particle/volume } VBe \text{ of circumsphere})^{(1/3)} \quad (3)$$

<Measurement of Content (Volume Ratio) of Filler in Elastic Layer>

First, the base layer and the surface layer were peeled from the fixing belt, and only the elastic layer was left. The specific gravity of the elastic layer was measured with an automatic specific gravity meter (product name: DSG-1, manufactured by Toyo Seiki Seisaku-sho, Ltd.). The volume ratio of the fillers was calculated by using the result, and the specific gravity of the binder of the elastic layer and the specific gravities of the fillers thereof. In addition, the volume ratio of the filler in the region A and the volume ratio of the filler in the region B were measured with a thermogravimetric analyzer (TGA) (product name: TGA851, manufactured by Mettler-Toledo International Inc.). Specifically, 20 mg of a sample, which had been cut out of each of the region A and the region B with a razor, was precisely weighed, and was loaded into an alumina pan to be used in the thermogravimetric analyzer. The alumina pan containing the sample was set in the thermogravimetric analyzer, and was heated from room temperature to 800° C. at a rate of temperature increase of 20° C. per minute under a nitrogen atmosphere. Further, the temperature was maintained at 800° C. for 1 hour. In the nitrogen atmosphere, a component except the fillers is decomposed and removed by cracking along with the temperature increase, and hence the mass of the filler in the sample can be calculated. Then, the volume ratio of the filler in each region and the volume ratio of the fillers with respect to the entirety of the elastic layer were calculated from the specific gravity of the binder of the elastic layer and the specific gravities of the fillers, and the mass of the filler in each sample.

<Measurement of Hardness of Elastic Layer>

The hardness (durometer hardness) of the elastic layer was measured as follows: the produced elastic layer was cut out, and the resultant pieces were superimposed on each other so that a thickness needed for the measurement was obtained, followed by the measurement based on Japanese Industrial Standard (JIS) K 6253:2012. More specifically, the measurement was performed in conformity with "Rubber, vulcanized or thermoplastic-Determination of hardness-Part 1: General guidance" specified in JIS K 6253-1:2012 and "Rubber, vulcanized or thermoplastic-Determination of hardness-Part 3: Durometer method" specified in JIS K 6253-3:2012. The hardness of each of Examples 1 to 15 and 18, and Comparative Examples 1 to 6 was measured with a type E durometer. Meanwhile, the hardness of each of Examples 16 and 17 was measured with the type E durometer, and as a result, the durometer hardness exceeded 20° (A20). Accordingly, the measurement was performed again with a type A durometer, and the measured value was regarded as the durometer hardness of the elastic layer according to each of Examples 16 and 17.

<Method of calculating Voronoi Regions>

As illustrated in FIG. 4B, a total of 10 samples 401 each measuring 5 mm long by 5 mm wide, and each having a thickness corresponding to the total thickness of the fixing belt were collected from 10 arbitrary sites of the fixing belt. In each of 5 samples out of the resultant 10 samples, a section in the peripheral direction of the fixing belt, that is, a section including the first section 401-1 in the thickness-peripheral directions of the elastic layer was subjected to polishing processing with an ion beam. In addition, in each of the remaining 5 samples, a section in the direction perpendicular to the peripheral direction of the fixing belt, that is, a section including the second section 401-2 in the thickness-axial directions of the elastic layer was subjected to polishing processing with an ion beam. A cross section polisher was used in the polishing processing of each of the sections with the ion beam.

Subsequently, for the 5 samples in each of which the first section 401-1 of the elastic layer had been subjected to the polishing processing, and the 5 samples in each of which the second section 401-2 of the elastic layer had been subjected to the polishing processing, the first section of the elastic layer and the second section of the elastic layer were observed with a scanning electron microscope (SEM). Specifically, a square sectional image measuring 50 μm by 50 μm was obtained at an arbitrary place in the region A (represented by reference symbol 403 in FIG. 5) of each sample.

Figure 6A:
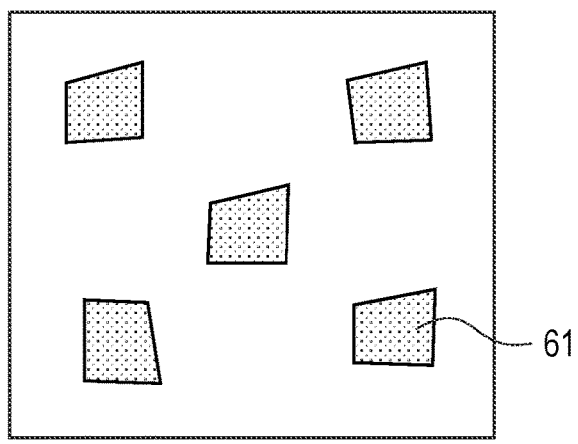
FIG. 6A, FIG. 6B, FIG. 6C, and FIG. 6D are schematic views of the binarization and Voronoi tessellation of a sectional image of the elastic layer.
Figure 6B:
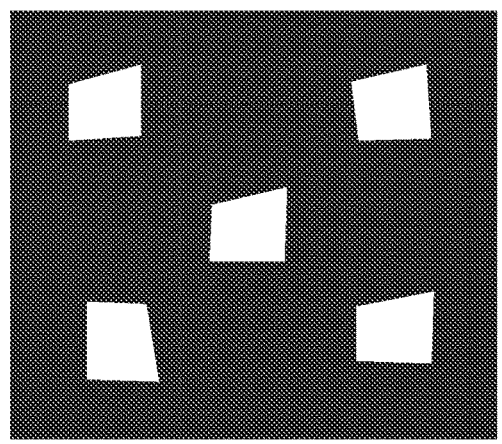
Figure 6C:
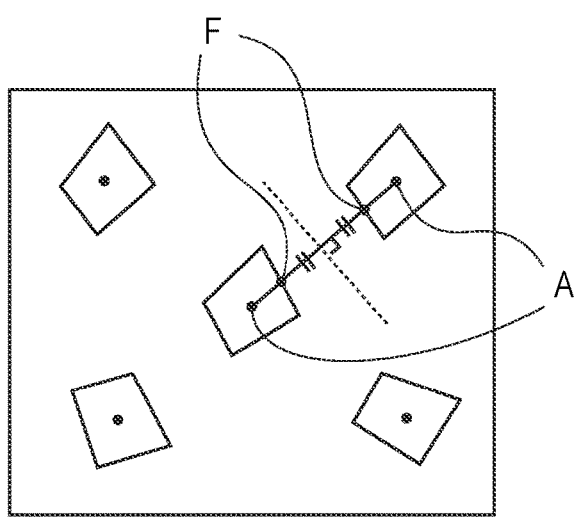
Figure 6D:
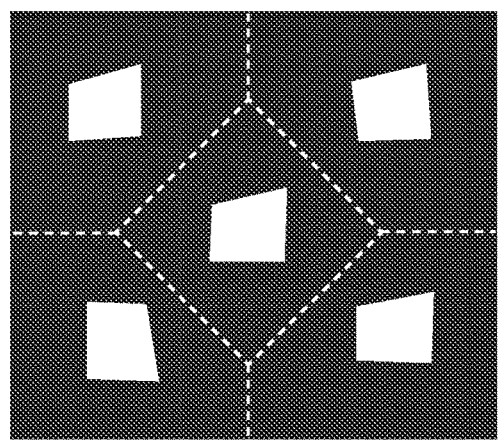

Next, such an obtained image as illustrated in FIG. 6A was subjected to monochromatic binarization processing with commercial image software so that portions corresponding to the filler particles 61 became white, and an elastic layer portion became black (FIG. 6B). Otsu's method was used as an approach for the binarization.

Further, the white portions of the produced binarized image were segmented with watershed algorithm.

The regions subjected to the segmentation with the watershed algorithm were subjected to Voronoi tessellation. Specifically, the Voronoi tessellation was performed by the following procedure. The positions of the centers of gravity (points A in FIG. 6C) of the respective white portion regions are calculated. All the centers of gravity of the adjacent white portion regions were connected with straight lines, and the straight lines were regarded as basic straight lines, followed by the calculation of the positions of the points of intersection (points F in FIG. 6C) of the outer peripheries of the respective segmented regions of the white portions and the basic straight lines. The two points of intersection F are typically produced on one straight line connecting the centers of gravity, and a perpendicular bisector between the two points of intersection is produced, and is regarded as a dividing line. When the adjacent portions are brought into contact with each other, the only one point of intersection F may be produced, but in such case, a line that is perpendicular to the basic straight line and passes through the point of intersection F is produced, and is regarded as a dividing line. When the dividing lines produced from the adjacent white portion regions are linked to each other, a region surrounded by the dividing lines is produced so as to surround each of the white regions (FIG. 6D). In this Example, the produced region was defined as a Voronoi region. The areas of the respective Voronoi regions thus formed were calculated, and their arithmetic average and standard deviation were represented by S and σ, respectively. In this case, a value obtained by dividing the σ by the S was defined as a coefficient of variation Av (=σ/S).

The coefficient of variation Av was calculated for each of the 10 SEM images produced in advance, and the average of the calculated values was regarded as an $Av_{ave}$. Thus, the coefficient of variation of the areas of the Voronoi regions of the filler in the region A of this Example was derived.

Evaluations of Various Fixation Characteristics of Fixing Device Using Fixing Belt of this Example Next, a fixing device mounted with the fixing belt according to this Example was evaluated for its various fixation characteristics.

First, the fixing belt according to this Example was mounted on the fixing device illustrated in FIG. 2.

(Peeling Durability Evaluation)

In the fixing device illustrated in FIG. 2, the pressurizing force of the fixing belt against the pressurizing roller and the rotational speed of the pressurizing roller were set to 300 N in terms of total pressure and 200 mm/s, respectively, and the temperature of the outer surface of the fixing belt in a region to be brought into contact with a recording material was controlled to 130° C. "GF-0081" (product name, manufactured by Nippon Paper Industries Co., Ltd.) was used as the recording material. When the result of the evaluation was any one of S to C in the following evaluation criteria, it was judged that the effect of the present disclosure was obtained.

(Evaluation Criteria)

Rank S: No peeling between the base layer and elastic layer of the fixing belt is observed even when printing is continuously performed on 1,000,000 sheets.

Rank A: Peeling between the base layer and the elastic layer occurs when printing is continuously performed on 900,000 or more and less than 1,000,000 sheets.

Rank B: Peeling between the base layer and the elastic layer occurs when printing is continuously performed on 800,000 or more and less than 900,000 sheets.

Rank C: Peeling between the base layer and the elastic layer occurs when printing is continuously performed on 700,000 or more and less than 800,000 sheets.

Rank D: Peeling between the base layer and the elastic layer occurs when printing is continuously performed on less than 700,000 sheets.

(Fixability Evaluation)

A reconstructed machine of a digital printer for commercial printing (product name: imageRUNNER ADVANCE C5560, manufactured by Canon Inc.) was used as an apparatus for forming an unfixed image. Specifically, the electrophotographic image forming apparatus was changed so that its fixation temperature, its process speed, a DC voltage VDC to be applied to a developer-carrying member thereof, a charging voltage VD to be applied to an electrostatic latent image-bearing member thereof, and its laser power were able to be arbitrarily set. In addition, a fixing device was removed from the apparatus.

Then, a blue unfixed solid image (FFh image) measuring 2 cm long by 5 cm wide was formed in a central portion on each of 5 sheets of A4 size paper (product name: GF-0081; manufactured by Nippon Paper Industries Co., Ltd.) with the above-mentioned apparatus for forming an unfixed image. At this time, the VDC, the VD, and the laser power were adjusted so that the laid-on level of unfixed toner on the paper for forming the FFh image on the paper became 0.70 mg/cm$^2$. Herein, FFh is a value obtained by representing 256 gray levels in hexadecimal notation, and 00 h corresponds to the first gray level (white ground portion) of the 256 gray levels, while FFh corresponds to the 256th gray level (solid portion) of the 256 gray levels.

Next, the above-mentioned 5 sheets of paper each having formed thereon the FFh image were continuously subjected to fixation with the fixing device having a structure illustrated in FIG. 2, the device being mounted with the fixing belt according to this Example, and the fifth fixed image was subjected to the following fixability evaluation test. In the fixing device, the pressurizing force of the fixing belt against the pressurizing roller was set to 300 N in total, the rotational speed of the pressurizing roller was set to 200 mm/s, and the temperature of the surface of the fixing belt to be brought into contact with the paper was set to 130° C.

<Fixability Evaluation Test>

Lens-cleaning paper was placed on the solid image of the fixed image to be evaluated, and under a state in which a load of 4.9 kPa (50 g/cm$^2$) was applied from above the lens-cleaning paper, the lens-cleaning paper was reciprocated five times to rub the solid image. Then, the image density of the solid image after the rubbing was measured again. Then, the percentage by which the image density reduced after the rubbing as compared to that before the rubbing was calculated by using the following equation. The resultant percentage by which the image density reduced was evaluated in accordance with the following evaluation criteria.

Percentage by which image density reduces=[(image density before rubbing-image density after rubbing)/image density before rubbing]×100

(Evaluation Criteria)

Rank A: The percentage by which the image density reduces is less than 3%.

Rank B: The percentage by which the image density reduces is 3% or more and less than 5%.

Rank C: The percentage by which the image density reduces is 5% or more and less than 8%.

Rank D: The percentage by which the image density reduces is 8% or more.

Examples 2 to 21 and Comparative Examples 1 to 6

The mixing ratios of the agent A and agent B of the addition-curable liquid silicone rubber (product name: SE1886, manufactured by Dow Corning Toray Co., Ltd.) when the total mixed amount of the agent A and the agent B was set to 100 were changed as shown in Table 2. In addition, the kinds of the fillers in the first and second paints were changed as shown in Table 2. Further, the amounts of the fillers in the first and second paints were changed to such amounts that the volume ratios thereof in the region A and region B of the elastic layer became values shown in Table 2. Further, at the time of the preparation of the first paint according to Example 18, the number of passes for kneading the first paint in Example 18 in a three-roll mill was set at 10 during its preparation. The first and second paints according to each of Examples 2 to 21 and Comparative Examples 1 to 6 were prepared in the same manner as in Example 1 except the foregoing.

Then, a fixing belt was produced in the same manner as in Example 1 except that the first and second paints according to each of Examples 2 to 21 and Comparative Examples 1 to 6 were used. However, in Examples 2 and 3, and Comparative Example 1, the thicknesses of the second coating films after their curing were changed to 150 µm, 2,950 µm, and 40 µm, respectively.

The resultant fixing belts were each evaluated in the same manner as in Example 1.

The evaluation results are shown in Table 2 and Table 3.

TABLE 2

| | | Thickness of elastic layer (µm) | Volume ratio of fillers with respect to entirety of elastic layer (vol %) | Mixing ratio of agent A | Mixing ratio of agent B | Elastic layer A | | |
|---|---|---|---|---|---|---|---|---|
| | | | | | | Kind of filler | Average of practical sphericities of filler | Volume ratio of filler (vol %) |
| Example | 1 | 350 | 50 | 50 | 50 | Filler 1 | 0.75 | 40 |
| | 2 | 200 | 50 | 50 | 50 | Filler 1 | 0.75 | 40 |
| | 3 | 3,000 | 50 | 50 | 50 | Filler 1 | 0.75 | 40 |
| | 4 | 350 | 40 | 50 | 50 | Filler 1 | 0.75 | 40 |
| | 5 | 350 | 60 | 50 | 50 | Filler 1 | 0.75 | 40 |
| | 6 | 350 | 50 | 50 | 50 | Filler 3 | 0.93 | 40 |
| | 7 | 350 | 50 | 50 | 50 | Filler 1 | 0.75 | 60 |
| | 8 | 350 | 50 | 50 | 50 | Filler 1 | 0.75 | 20 |
| | 9 | 350 | 50 | 50 | 50 | Filler 6 | 0.75 | 40 |
| | 10 | 350 | 40 | 50 | 50 | Filler 8 | 0.75 | 40 |
| | 11 | 350 | 55 | 50 | 50 | Filler 4 | 0.75 | 25 |
| | 12 | 350 | 50 | 50 | 50 | Filler 4 | 0.75 | 40 |

TABLE 2-continued

|  |  |  |  |  |  |  |  |  |
|---|---|---|---|---|---|---|---|---|
|  | 13 | 350 | 50 | 50 | 50 | Filler 6 | 0.75 | 40 |
|  | 14 | 350 | 50 | 50 | 50 | Filler 8 | 0.75 | 40 |
|  | 15 | 350 | 50 | 48 | 52 | Filler 1 | 0.75 | 40 |
|  | 16 | 350 | 50 | 40 | 60 | Filler 1 | 0.75 | 40 |
|  | 17 | 350 | 50 | 35 | 65 | Filler 1 | 0.75 | 40 |
|  | 18 | 350 | 50 | 60 | 40 | Filler 1 | 0.75 | 40 |
| Comparative Example | 1 | 90 | 50 | 50 | 50 | Filler 1 | 0.75 | 40 |
|  | 2 | 350 | 38 | 50 | 50 | Filler 1 | 0.75 | 40 |
|  | 3 | 350 | 63 | 50 | 50 | Filler 1 | 0.75 | 65 |
|  | 4 | 350 | 50 | 50 | 50 | Filler 10 | 0.7 | 40 |
|  | 5 | 350 | 42 | 50 | 50 | Filler 1 | 0.75 | 60 |
|  | 6 | 350 | 50 | 50 | 50 | Filler 1 | 0.75 | 40 |

|  |  | Elastic layer B | | Thermal conductivity of entirety of elastic layer (W/(m·K)) | Particle diameter D50 of fillers in entirety of elastic layer (μm) | JIS-A hardness of elastic layer (°) | Coefficient of variation of areas of Voronoi regions of elastic layer A |
|---|---|---|---|---|---|---|---|
|  |  | Kind of filler | Average of practical sphericities of filler | Volume ratio of filler (vol %) |  |  |  |  |
| Example | 1 | Filler 2 | 0.29 | 51.7 | 0.83 | 4 | 7 | 1.5 |
|  | 2 | Filler 2 | 0.29 | 53.3 | 0.83 | 4 | 7 | 1.5 |
|  | 3 | Filler 2 | 0.29 | 50.2 | 0.83 | 4 | 7 | 1.5 |
|  | 4 | Filler 2 | 0.29 | 40 | 0.6 | 4 | 7 | 1.5 |
|  | 5 | Filler 2 | 0.29 | 63.3 | 1.1 | 4 | 7 | 1.5 |
|  | 6 | Filler 2 | 0.29 | 51.7 | 0.7 | 4 | 7 | 1.5 |
|  | 7 | Filler 2 | 0.29 | 48.3 | 0.8 | 4 | 7 | 1.5 |
|  | 8 | Filler 2 | 0.29 | 55 | 0.83 | 4 | 7 | 1.5 |
|  | 9 | Filler 7 | 0.29 | 51.7 | 0.9 | 30 | 7 | 1.5 |
|  | 10 | Filler 9 | 0.29 | 40 | 0.4 | 32 | 7 | 1.5 |
|  | 11 | Filler 5 | 0.29 | 60 | 1.5 | 5 | 7 | 1.5 |
|  | 12 | Filler 5 | 0.29 | 51.7 | 0.85 | 5 | 7 | 1.5 |
|  | 13 | Filler 7 | 0.29 | 51.7 | 0.85 | 30 | 7 | 1.5 |
|  | 14 | Filler 9 | 0.29 | 51.7 | 0.82 | 32 | 7 | 1.5 |
|  | 15 | Filler 2 | 0.29 | 51.7 | 0.81 | 4 | 9 | 1.5 |
|  | 16 | Filler 2 | 0.29 | 51.7 | 0.83 | 4 | 25 | 1.5 |
|  | 17 | Filler 2 | 0.29 | 51.7 | 0.81 | 4 | 26 | 1.5 |
|  | 18 | Filler 2 | 0.29 | 51.7 | 0.82 | 4 | 15 | 1.2 |
| Comparative Example | 1 | Filler 1 | 0.29 | 62.5 | 0.82 | 4 | 7 | 1.5 |
|  | 2 | Filler 1 | 0.29 | 37.7 | 0.75 | 4 | 7 | 1.5 |
|  | 3 | Filler 2 | 0.29 | 62.7 | 0.9 | 4 | 7 | 1.5 |
|  | 4 | Filler 2 | 0.29 | 51.7 | 0.84 | 4 | 7 | 1.5 |
|  | 5 | Filler 2 | 0.29 | 39 | 0.82 | 4 | 7 | 1.5 |
|  | 6 | Filler 1 | 0.8 | 51.7 | 0.38 | 4 | 7 | 1.5 |

TABLE 3

|  |  | Fixability evaluation | | Durability evaluation | |
|---|---|---|---|---|---|
|  |  | Rank | Percentage by which image density reduces (%) | Rank | Number of sheets |
| Example | 1 | B | 4.0 | B | 800 |
|  | 2 | B | 4.0 | B | 800 |
|  | 3 | B | 4.0 | B | 800 |
|  | 4 | B | 4.5 | B | 800 |
|  | 5 | B | 3.0 | B | 800 |
|  | 6 | B | 4.5 | B | 800 |
|  | 7 | B | 4.0 | B | 800 |
|  | 8 | B | 4.0 | B | 800 |
|  | 9 | B | 4.0 | B | 800 |
|  | 10 | B | 4.5 | B | 800 |
|  | 11 | B | 3.0 | B | 800 |
|  | 12 | A | 2.5 | B | 800 |
|  | 13 | A | 2.5 | B | 800 |
|  | 14 | A | 2.5 | C | 700 |
|  | 15 | A | 2.5 | A | 900 |
|  | 16 | A | 2.0 | A | 900 |
|  | 17 | B | 4.0 | A | 900 |
|  | 18 | A | 2.5 | S | 1100 |
| Comparative Example | 1 | B | 3.0 | D | 500 |
|  | 2 | D | 8.0 | B | 800 |
|  | 3 | B | 3.0 | D | 400 |
|  | 4 | B | 3.0 | D | 500 |
|  | 5 | B | 3.0 | D | 500 |
|  | 6 | D | 8.0 | B | 800 |

As shown in Table 3, when each of the elastic layers of Examples 1 to 18 was used, the heat transfer performance of the layer was improved, and hence the fixability of the fixing belt was able to be improved while the peeling between the base layer and the elastic layer was prevented.

In addition, in each of Examples 12 to 16, an improvement in thermal conductivity of the elastic layer was able to improve the fixability of the fixing belt while improving the durability thereof.

In addition, in each of Examples 15 to 18, an increase in hardness of the elastic layer was able to achieve further lengthening of the lifetime of the fixing belt.

In addition, in Example 18, the thermal conductivity and durability of the fixing belt were able to be further improved by improving the dispersibility of the filler in the region A to reduce the coefficient of variation of the areas of the Voronoi regions therein.

As described above, there was able to be provided the fixing belt, which prevented the peeling of its base layer through a reduction in shear force occurring at an interface between the base layer and its elastic layer by the adjustment of the sphericities of the filler particles in the elastic layer near the surface layer, and hence was able to achieve flexibility, high thermal conductivity, and a lengthened lifetime.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-104586, filed Jun. 29, 2022, and Japanese Patent Application No. 2023-099353, filed Jun. 16, 2023, which are hereby incorporated by reference herein in their entirety.

What is claimed is:

1. A fixing belt comprising:
a base layer;
an elastic layer; and
a surface layer,
the elastic layer having a total thickness of from 200 μm to 3,000 μm,
the elastic layer having a thermal conductivity of 0.4 W/(m·K) or more in a total thickness direction thereof,
the elastic layer containing filler particles in a content of 40 vol % to 60 vol % with respect to total volume of the elastic layer, wherein
the filler particles contained in a region A have a practical sphericity SA of 0.75 or more, the practical sphericity SA representing a shape of the filler particles contained in the region A, and a content ratio of the filler particles contained in the region A with respect to the region A is 60 vol % or less, where the region A is a region in a range from an interface between the base layer and the elastic layer to a depth of 50 μm in the thickness direction of the elastic layer, and
the filler particles contained in a region B have a practical sphericity of less than 0.75, the practical sphericity SB representing a shape of the filler particles contained in the region B, and a content ratio of the filler particles contained in the region B with respect to the region B is 40 vol % or more, where the region B is a region corresponding to a depth of 50 μm or more from the interface between the base layer and the elastic layer in the thickness direction of the elastic layer, and
wherein the practical sphericity SA is calculated from equation (3), and the practical sphericity SB is calculated from equation (4):

$$SA = (VA/VAe)^{(1/3)} \quad \text{Equation (3)}$$

where VA represents a volume of the filler particles in the region A, and VAe represents a volume of a circumsphere of the filler particles in the region A;

$$SB = (VB/VBe)^{(1/3)} \quad \text{Equation (4)}$$

where VB represents a volume of the filler particles in the region B, and VBe represents a volume of a circumsphere of the filler particles in the region B.

2. The fixing belt according to claim 1, wherein the thermal conductivity is from 0.80 W/(m·K) to 1.50 W/(m·K).

3. The fixing belt according to claim 1, wherein the elastic layer has a thickness of from 350 μm to 3,000 μm.

4. The fixing belt according to claim 1, wherein the content ratio of the filler particles contained in the region A with respect to the region A is from 20 vol % to 60 vol %.

5. The fixing belt according to claim 1, wherein the practical sphericity SA is from 0.75 to 0.93.

6. The fixing belt according to claim 1, wherein the content ratio of the filler particles contained in the region B with respect to the region B is from 40 vol % to 63 vol %.

7. The fixing belt according to claim 1, wherein the practical sphericity SB is or more and less than 0.75.

8. The fixing belt according to claim 1, wherein the filler particles contained in the region A are at least one selected from the group consisting of titanium oxide and alumina.

9. The fixing belt according to claim 1, wherein a particle diameter D50 of the filler particles contained in the region A is from 5 μm to 30 μm.

10. The fixing belt according to claim 1, wherein the filler particles contained in the region B are boron nitride.

11. The fixing belt according to claim 1, wherein a particle diameter D50 of the filler particles contained in the region B is from 5 μm to 30 μm.

12. The fixing belt according to claim 1, wherein a particle diameter D50 of the filler particles contained in the region A is from 5 μm to 30 μm, and a particle diameter D50 of the filler particles contained in the region B is from 5 μm to 30 μm.

13. The fixing belt according to claim 1, wherein the elastic layer has a durometer hardness of from 9° to 25°, the durometer hardness being measured in accordance with Japanese Industrial Standard (JIS) K 6253-3:2012.

14. The fixing belt according to claim 1, wherein when a Volonoi tessellation is conducted on a cross section of the region A of the elastic layer, the cross section being in a direction perpendicular to a peripheral direction of the elastic layer, and the Volonoi tessellation being conducted with the filler particles exposed on the cross section of the region A as generation points,
an arithmetic average and standard deviation of Volonoi areas resulting from the Volonoi tessellation are defined as S and σ respectively a coefficient of variation calculated from a following equation in the region A is 1.5 or less:

$$\text{coefficient of variation} = (\sigma/S).$$

15. The fixing belt according to claim 14, wherein the coefficient of variation is 1.2 or less.

16. A heat fixing device comprising:
a fixing belt; and
a pressurizing member disposed so as to face the fixing belt,
wherein the fixing belt includes a base layer, an elastic layer, and a surface layer,
the elastic layer has a total thickness of from 200 μm to 3,000 μm,
the elastic layer has a thermal conductivity of 0.4 W/(m·K) or more in a total thickness direction thereof,
the elastic layer contains filler particles in a content of 40 vol % to 60 vol % with respect to the total volume of the elastic layer,
wherein the filler particles contained in a region A have a practical sphericity SA of 0.75 or more, the practical sphericity SA representing a shape of the filler particles contained in the region A, and a content ratio of the filler particles contained in the region A with respect to the region A is 60 vol % or less, where the region A is a region in a range from an interface between the base layer and the elastic layer to a depth of 50 μm in the thickness direction of the elastic layer, and the filler particles contained in a region B have a practical sphericity of less than 0.75, the practical sphericity SB representing a shape of the filler particles contained in the region B, and a content ratio of the filler particles contained in the region B with respect to the region B is 40 vol % or more, where the region B is a region corresponding to a depth of 50 μm or more from the interface between the base layer and the elastic layer in the thickness direction of the elastic layer, and wherein the practical sphericity SA is calculated from (3), and the practical sphericity SB is calculated from equation (4):

$$SA = (VA/VAe)^{(1/3)} \qquad \text{Equation (3)}$$

where VA represents a volume of the filler particles in the region A, and VAe represents a volume of a circumsphere of the filler particles in the region A;

$$SB = (VB/VBe)^{(1/3)} \qquad \text{Equation (4)}$$

where VB represents a volume of the filler particles in the region B, and VBe represents a volume of a circumsphere of the filler particles in the region B.

* * * * *